(12) United States Patent
Yang et al.

(10) Patent No.: US 10,476,650 B2
(45) Date of Patent: Nov. 12, 2019

(54) CONTROL CHANNEL WITH FLEXIBLE NUMEROLOGY

(71) Applicant: QUALCOMM Incorporated, San Diego, CA (US)

(72) Inventors: Yang Yang, San Diego, CA (US); Jing Jiang, San Diego, CA (US); Alexandros Manolakos, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 15/603,158

(22) Filed: May 23, 2017

(65) Prior Publication Data

US 2018/0054292 A1    Feb. 22, 2018

Related U.S. Application Data

(60) Provisional application No. 62/377,522, filed on Aug. 19, 2016.

(51) Int. Cl.
*H04L 5/00* (2006.01)
*H04L 27/26* (2006.01)
(Continued)

(52) U.S. Cl.
CPC ............ *H04L 5/0094* (2013.01); *H04L 5/001* (2013.01); *H04L 5/0042* (2013.01);
(Continued)

(58) Field of Classification Search
CPC ...... H04L 5/0094; H04L 5/0042; H04L 5/001
See application file for complete search history.

(56) References Cited

U.S. PATENT DOCUMENTS 8,144,571 B2   3/2012   Lee et al.
8,284,851 B2   10/2012  Yoshimoto et al.
(Continued)

FOREIGN PATENT DOCUMENTS

WO   WO-2008097038 A2 *   8/2008   ............ H04L 5/0007

OTHER PUBLICATIONS

ISA/EP, International Search Report and Written Opinion of the International Searching Authority, Int'l Application No. PCT/US2017/045525, dated Jan. 18, 2018, European Patent Office, Rijswijk, NL, 20 pgs.

(Continued)

*Primary Examiner* — Jamal Javaid
(74) *Attorney, Agent, or Firm* — Holland & Hart LLP

(57) ABSTRACT

Techniques are described for wireless communication. One method for wireless communication includes transmitting, to a user equipment (UE), an indication of a control channel subcarrier spacing to be used by the UE; and transmitting a control message having a subcarrier spacing in accordance with the indication. Another method for wireless communication includes transmitting, to a UE, an indicator channel identifying at least a subcarrier spacing to be used in one or more subsequent control channels. One or more subsequent control channels are then transmitted in accordance with the subcarrier spacing indicated by the indicator channel.

41 Claims, 13 Drawing Sheets

(51) Int. Cl.
*H04W 76/10* (2018.01)
*H04B 7/06* (2006.01)
*H04W 72/04* (2009.01)

(52) U.S. Cl.
CPC ........ *H04L 5/0091* (2013.01); *H04L 27/2646* (2013.01); *H04B 7/0632* (2013.01); *H04W 72/042* (2013.01); *H04W 72/0413* (2013.01); *H04W 76/10* (2018.02)

(56) References Cited

U.S. PATENT DOCUMENTS

| | | |
|---|---|---|
| 8,755,348 B2 | 6/2014 | He et al. |
| 9,331,826 B2 * | 5/2016 | Kim .................... H04L 5/001 |
| 2010/0080114 A1 * | 4/2010 | Ratnam ................ H04L 5/0007 |
| | | 370/210 |
| 2011/0164548 A1 | 7/2011 | Kim et al. |
| 2012/0147846 A1 | 6/2012 | Ho et al. |
| 2015/0043491 A1 | 2/2015 | Eng et al. |
| 2017/0041948 A1 * | 2/2017 | Cheng .................. H04L 5/0051 |

OTHER PUBLICATIONS

ISA/EPO, Partial International Search Report of the International Searching Authority, Int'l. App. No, PCT/US2017/045525, dated Nov. 10, 2017, European Patent Office, Rijswijk, NL, 14 pgs.

\* cited by examiner

CONTROL CHANNEL WITH FLEXIBLE NUMEROLOGY

CROSS REFERENCES

The present Application for patent claims priority to U.S. Provisional Patent Application No. 62/377,522 by Yang, et al., entitled "Radio Control Channel With Flexible Numerology," filed Aug. 19, 2016, assigned to the assignee hereof.

INTRODUCTION

The present disclosure, for example, relates to wireless communication systems, and more particularly to a new radio control channel with flexible numerology.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

In some examples, a wireless multiple-access communication system may include a number of base stations, each simultaneously supporting communication for multiple communication devices, otherwise known as user equipment (UEs). In a Long-Term Evolution (LTE) or LTE-Advanced (LTE-A) network, a set of one or more base stations may define an eNodeB (eNB). In other examples (e.g., in a next generation or 5G network), a wireless multiple access communication system may include a number of smart radio heads (RHs) in communication with a number of access node controllers (ANCs), where a set of one or more RHs, in communication with an ANC, may define an eNB. A base station or radio head may communicate with a set of UEs on downlink channels (e.g., for transmissions from a base station or radio head to a UE) and uplink channels (e.g., for transmissions from a UE to a base station or radio head).

A UE may receive control messages from a network access device in accordance with a control channel numerology. The control channel numerology may indicate, for example, a subcarrier spacing and symbol period duration of control channel resources allocated by the network access device.

SUMMARY

In one example, a method for wireless communication is described. The method may include receiving, at a UE, an indication of a control channel subcarrier spacing to be used by the UE; configuring the UE to use the control channel subcarrier spacing based on the indication; receiving a control message; and decoding at least a portion of the control message using the control channel subcarrier spacing.

In one example, another method for wireless communication is described. The method may include transmitting, to a UE, an indication of a control channel subcarrier spacing to be used by the UE; and transmitting a control message having a subcarrier spacing in accordance with the indication.

In one example, another method for wireless communication is described. The method may include receiving, at a UE, an indicator channel identifying at least a subcarrier spacing to be used in one or more subsequent control channels; decoding the indicator channel; receiving the one or more subsequent control channels; and decoding the one or more subsequent control channels in accordance with the subcarrier spacing indicated by the indicator channel.

In one example, another method for wireless communication is described. The method may include transmitting, to a UE, an indicator channel identifying at least a subcarrier spacing to be used in one or more subsequent control channels; and transmitting the one or more subsequent control channels in accordance with the subcarrier spacing indicated by the indicator channel.

Apparatus including means for performing one or more of the preceding methods for wireless communication is also described. Apparatus including a processor, memory in electronic communication with the processor, and instructions stored in the memory for performing one or more of the preceding methods for wireless communication is also described. Non-transitory computer-readable mediums storing computer-executable code for performing one or more of the preceding methods for wireless communication is also described.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
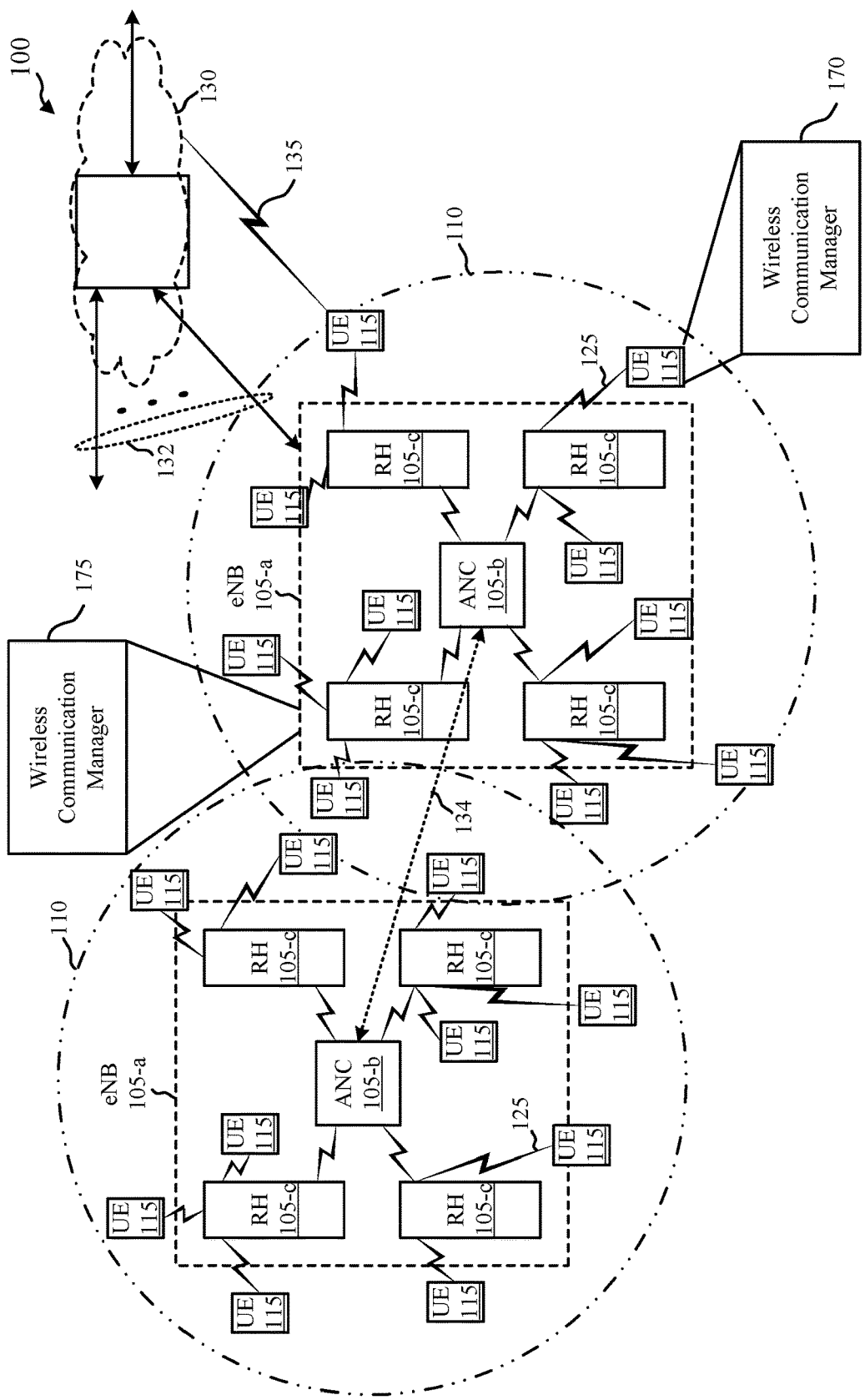
FIG. 1 illustrates an example of a wireless communication system, in accordance with one or more aspects of the present disclosure.

The present disclosure describes techniques for providing a New Radio (NR) control channel with flexible numerology.

An NR control channel may include one or a plurality of base symbol periods and one or a plurality of scaled symbol periods. Different control channel numerologies may be defined, for example, by different combinations of subcarrier spacing in the frequency domain and symbol period duration in the time domain. For example, a base (first) control channel numerology may be associated with a subcarrier spacing of 15 kHz and a symbol period duration, while a scaled (second) control channel numerology may be associated with a subcarrier spacing of 30 kHz and a symbol period duration that is half the duration of the first symbol period duration, and a third control channel numerology may be associated with a subcarrier spacing of 60 kHz and a symbol period duration that is a quarter of the duration of the first symbol period duration. A control channel may contain any combination of different numerologies. In one example, a control channel sequence may have one or more instances of a base numerology as well as one or more instances of other scaled numerologies. For example, the control channel sequence may include scaled symbols having twice the subcarrier spacing of the base control channel numerology. In another example, a scaled symbol may have four times the subcarrier spacing of the base control channel numerology. The control channel sequence may include other scaled symbols as well, and the scaled symbols and base symbol may be arranged in any order. In one example, the use of different numerologies within a control channel sequence may enable different UE to be addressed (via different symbols having different numerologies).

In some examples, an indication identifies the UE-specific numerology for one or more UEs, and the indication may be transmitted for example, from a base station to one or more UEs. A UE may be configured to perform blind decoding of a control channel assuming the configured numerology based on the indication. A base station may indicate a change in the control channel numerology sequence on a sub-frame basis or in a master information block (MIB) and/or a system information block (SIB).

In some examples, an indicator channel identifies the numerology sequence in the next one or more control symbols, and the indicator channel may be transmitted (e.g., from a base station to one or more UEs) before each change in the base station's control channel numerology sequence, at a boundary of each real or virtual base symbol period, before each of a number of groups of symbol periods, or before each symbol period.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in other examples.

FIG. 1 illustrates an example of a wireless communication system 100, in accordance with one or more aspects of the disclosure. The wireless communications system 100 includes base stations 105 (e.g., gNodeBs (gNBs), and/or RHs), UEs 115, and a core network 130. In some examples, the wireless communications system 100 may be a LTE (or LTE-Advanced) network.

The core network 130 may provide user authentication, access authorization, tracking, Internet Protocol (IP) connectivity, and other access, routing, or mobility functions. At least some of the base stations 105 (e.g., eNodeBs (eNBs), network access devices, gNBs) 105-a, gNBs, or ANCs may interface with the core network 130 through backhaul links 132 (e.g., S1, S2, etc.) and may perform radio configuration and scheduling for communication with the UEs 115. In various examples, the ANCs 105-b may communicate, either directly or indirectly (e.g., through core network 130), with each other over backhaul links 134 (e.g., X1, X2, etc.), which may be wired or wireless communication links. Each ANC 105-b may additionally or alternatively communicate with a number of UEs 115 through a number of smart RHs 105-c. In an alternative configuration of the wireless communication system 100, the functionality of an ANC 105-b may be provided by a radio head 105-c or distributed across the RHs 105-c of an eNB 105-a. In another alternative configuration of the wireless communication system 100, the RHs 105-c may be replaced with base stations, and the ANCs 105—may be replaced by base station controllers (or links to the core network 130).

The ANCs 105-b may wirelessly communicate with the UEs 115 via one or more RHs 105-c, with each radio head 105-c having one or more antennas. Each of the RHs 105-c may provide communication coverage for a respective geographic coverage area 110. The geographic coverage area 110 for a radio head 105-*c* may be divided into sectors making up only a portion of the coverage area (not shown). In some examples, the network access devices 105 may be replaced with alternative network access devices, such as base transceiver stations, radio base stations, access points, radio transceivers, NodeBs, eNBs, Home NodeBs, Home eNBs, etc. The wireless communication system 100 may include RHs 105-*c* (or base stations or other network access devices) of different types (e.g., macro cell and/or small cell network access devices). The geographic coverage areas 110 of the RHs 105-*c* or other network access devices may overlap. In some examples, different eNBs 105-*a* may be associated with different radio access technologies.

In some examples, the wireless communication system 100 may include a 5G network. In other examples, the wireless communication system 100 may include a LTE/LTE-A network. The wireless communication system 100 may in some cases be a heterogeneous network, in which different types of eNBs provide coverage for various geographical regions. For example, each eNB 105-*a* or radio head 105-*c* may provide communication coverage for a macro cell, a small cell, and/or other types of cell. The term "cell" is a 3GPP term that can be used to describe a base station, a radio head, a carrier or component carrier associated with a base station or a radio head, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell may additionally or alternatively cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communication system 100 may support synchronous or asynchronous operation. For synchronous operation, the eNBs 105-*a* and/or RHs 105-*c* may have similar frame timing, and transmissions from different eNBs 105-*a* and/or RHs 105-*c* may be approximately aligned in time. For asynchronous operation, the eNBs 105-*a* and/or RHs 105-*c* may have different frame timings, and transmissions from different eNBs 105-*a* and/or RHs 105-*c* may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may additionally or alternatively use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a radio head 105-*c*, ANC 105-*b*, or core network 130 supporting radio bearers for user plane data. At the Physical (PHY) layer, transport channels may be mapped to physical channels.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. A UE 115 may communicate with the core network 130 through communication link 135. UEs 115 may be dispersed throughout the wireless communications system 100, and each UE 115 may be stationary or mobile.

A UE 115 may additionally or alternatively include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a IoE device, or the like. A UE may be able to communicate with various types of eNBs 105-*a*, RHs 105-*c*, base stations, access points, or other network access devices, including macro eNBs, small cell eNBs, relay base stations, and the like. A UE may additionally or alternatively be able to communicate directly with other UEs (e.g., using a peer-to-peer (P2P) protocol).

The communication links 125 shown in wireless communication system 100 may include uplink (UL) channels from a UE 115 to a radio head 105-*c*, and/or downlink (DL) channels, from a radio head 105-*c* to a UE 115. The downlink channels may additionally or alternatively be called forward link channels, while the uplink channels may additionally or alternatively be called reverse link channels. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques (e.g., as described with reference to FIGS. 3-8). In some examples, the control information transmitted during a transmission time interval (TTI) or slot of a downlink channel may be distributed between different control regions in a cascaded manner (e.g., between a common control region and one or more UE-specific control regions).

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing (TDD) techniques (e.g., using unpaired spectrum resources). Frame structures for FDD (e.g., frame structure type 1) and TDD (e.g., frame structure type 2) may be defined.

In some examples of the wireless communication system 100, the RHs 105-*c* and/or UEs 115 may include multiple antennas for employing antenna diversity schemes to improve communication quality and reliability between RHs 105-*c* and UEs 115. Additionally or alternatively, RHs 105-*c* and/or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may additionally or alternatively be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In an LTE/LTE-A network, a UE 115 may be configured to communicate using up to five CCs when operating in a carrier aggregation mode or dual-connectivity mode. One or more of the CCs may be configured as a DL CC, and one or more of the CCs may be configured as a UL CC. Also, one of the CCs allocated to a UE 115 may be configured as a primary CC (PCC), and the remaining CCs allocated to the UE 115 may be configured as secondary CCs (SCCs).

In some examples, a UE 115 may include a wireless communication manager 170. In some examples, the wireless communication manager 170 may be used to receive an indication of a control channel subcarrier spacing to be used by a UE including the apparatus; to configure the UE to use the control channel subcarrier spacing based on the indication; to receive a control message; and to decode at least a portion of the control message using the control channel subcarrier spacing. Additionally or alternatively, the wireless communication manager 170 may be used to receive an indicator channel identifying at least a subcarrier spacing to be used in one or more subsequent control channels; to decode the indicator channel; to receive the one or more subsequent control channels; and to decode the one or more subsequent control channels in accordance with the subcarrier spacing indicated by the indicator channel.

In some examples, a base station 105 may include a wireless communication manager 175. The wireless communication manager 175 may be used to transmit, to a UE, an indication of a control channel subcarrier spacing to be used by the UE; and to transmit a control message having a subcarrier spacing in accordance with the indication. Additionally or alternatively, the base station wireless communication manager 1020 may be used to transmit, to a UE, an indicator channel identifying at least a subcarrier spacing to be used in one or more subsequent control channels; and to transmit the one or more subsequent control channels in accordance with the subcarrier spacing indicated by the indicator channel.

Figure 2:
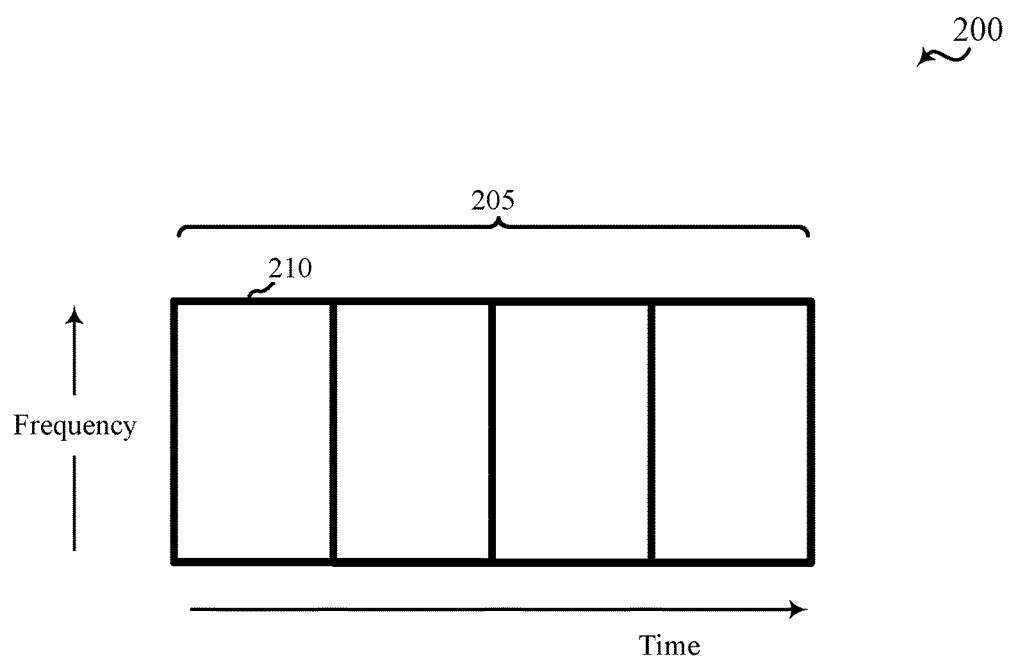
FIG. 2 shows a first time and frequency representation of a control channel (or control region), in accordance with one or more aspects of the present disclosure.

FIG. 2 shows a first time and frequency representation 200 of a control channel 205 (or control region), in accordance with various aspects of the present disclosure. The control channel 205 may include one or a plurality of symbol periods 210. In some examples, the control channel 205 may be transmitted as part of a subframe (e.g., transmitted in the first one or more symbol periods of a subframe). By way of example, the control channel 205 is shown to include four symbol periods 210. A base station may transmit control messages to one or more UEs on the control channel 205.

In some examples, different UEs within a wireless communication system (e.g., different UEs 115 within the wireless communication system 100) may communicate with a same base station (e.g., a base station 105) or different base stations using different control channel numerologies. Different control channel numerologies may be defined, for example, by different combinations of subcarrier spacing in the frequency domain and symbol period duration in the time domain. For example, a base (or first) control channel numerology may be associated with a subcarrier spacing of 15 kHz and the symbol period duration shown in FIG. 2, while a scaled (or second) control channel numerology may be associated with a subcarrier spacing of 30 kHz and a symbol period duration that is half the duration of the symbol period duration shown in FIG. 2.

In some cases (e.g., in millimeter wave applications), scaled control channel numerologies may be useful for UE control message multiplexing. In some millimeter wave applications (and other applications), UE control messages may not be multiplexed within the same symbol period, but may be multiplexed in different symbol periods.

In some examples, the base control channel numerology shown in FIG. 2 may be used for UEs that are near an edge of a cell coverage area. UEs that are near an edge of a cell coverage area may require a longer symbol period, thus smaller subcarrier spacing, due to the increase in propagation delay of signals.

Figure 3:
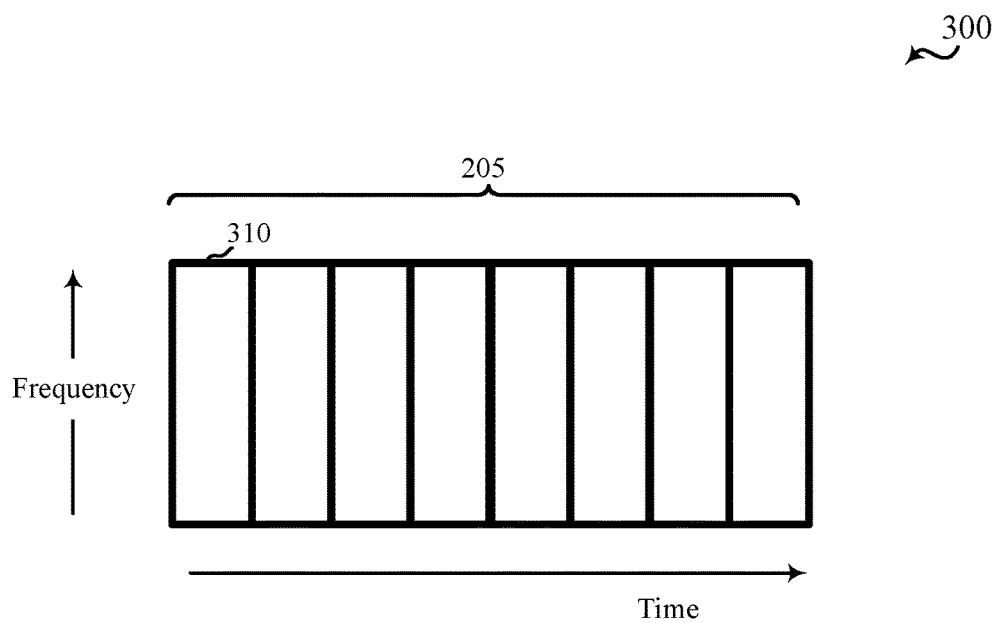
FIG. 3 shows a second time and frequency representation of the control channel (or control region) shown in FIG. 2, in accordance with one or more aspects of the present disclosure.

FIG. 3 shows a second time and frequency representation 300 of the control channel 205 (or control region) shown in FIG. 2, in accordance with various aspects of the present disclosure. In FIG. 3, the control channel 205 is configured in accordance with a scaled (or second) control channel numerology. By way of example, the scaled control channel numerology may have a subcarrier spacing that is two times the subcarrier spacing of the base control channel numerology shown in FIG. 2 (i.e., the subcarrier spacing of the scaled control channel numerology may be finer or more granular than the subcarrier spacing of the base control channel numerology shown in FIG. 2), and a symbol period duration that is half the symbol period duration of the base control channel numerology shown in FIG. 2. When configured as shown in FIG. 3, the control channel 205 may include eight symbol periods 310.

In some examples, the scaled control channel numerology shown in FIG. 3 may be used for UEs that are closer to a base station than UEs for which the base control channel numerology shown in FIG. 2 is used. UEs that are closer to a base station may not need to account for delays due to their proximity to the base station. In order to conserve and efficiently use resources, the symbol period may be shorter, thus the subcarrier spacing larger, than that used for UEs farther from the base station.

Figure 4:
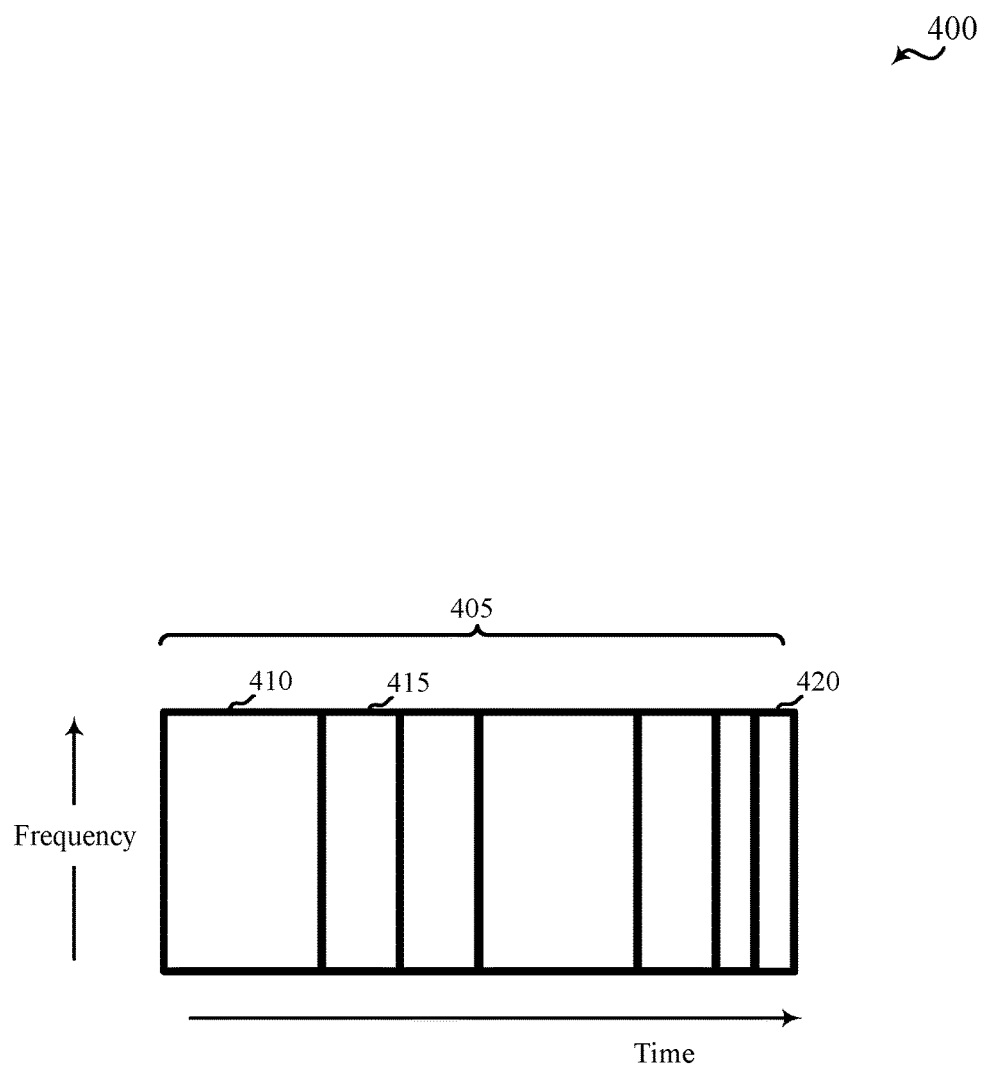
FIG. 4 shows a time and frequency representation of a control channel (or control region), in accordance with one or more aspects of the present disclosure.

FIG. 4 shows a time and frequency representation 400 of a control channel 405 (or control region), in accordance with various aspects of the present disclosure. The control channel 405 may include one or a plurality of base symbol periods 410, and one or a plurality of scaled symbol periods 415 and 420. In some examples, the control channel 405 may be transmitted as part of a subframe (e.g., transmitted in the first one or more symbol periods of a subframe). The base symbol periods 410 may be defined by a base control channel numerology, and the scaled symbol periods 415 and 420 may be defined by one or more scaled control channel numerologies. The one or more scaled symbol periods 415 and 420 may include a first scaled symbol period 415 having twice the subcarrier spacing of the base control channel numerology (e.g., 2×15 kHz=30 kHz), and a symbol period duration that is half the duration of the base symbol period 410. In some examples, the one or more scaled symbol periods may additionally or alternatively include a second scaled symbol period 420 having four times the subcarrier spacing of the base control channel numerology (e.g., 4×15 kHz=60 kHz), and a symbol period duration that is one quarter the duration of the base symbol period 410. In alternative configurations, the control channel 405 may have additional types of scaled symbol periods.

When a base station uses multiple numerologies in a single control channel 405, there may be one or a plurality of different subcarrier spacings within the individual control channel 405 as described above. The subcarrier spacing may vary in a single control channel on a single frequency band because control messages, unlike data transmissions, are typically small enough to fit into one single symbol period. Further, the control channel may be broadcast to multiple UEs within a cell and may contain different information for each UE within the cell. The control channel may be able to communicate unique information to each of the multiple UEs by using multiple numerologies that are UE specific in a single control channel. Thus, each UE may receive a unique control message through the communication of a single control channel. This provides an advantage over transmissions that must be directed to a single device due to the use of one subcarrier spacing.

By way of example, the control channel 405 is shown to have a control channel numerology sequence in which a symbol period 410 is followed by two symbol periods 415, then one symbol period 410, then one symbol period 415, then two symbol periods 420. A UE configured according to the base control channel numerology may be addressed (e.g., a base station may transmit a control message to the UE) in one of the symbol periods 410. A UE configured according to the first scaled control channel numerology may be addressed in one of the symbol periods 415. A UE configured according to the second scaled control channel numerology may be addressed in one of the symbol periods 420.

In some examples of the control channel 405, a symbol period defined by the base control channel numerology (e.g., the sequentially first symbol period 410) may be designated as a common control symbol period in which control messages may be sent to UEs nominally operating in accordance with different control channel numerologies. The location of the common control symbol period may be indicated to UEs (e.g., by a base station) in a SIB or MIB, for example.

In some examples, a UE configured to operate in accordance with a control channel numerology may attempt blind decoding within the control channel 405 as if all of the base symbol periods are configured in accordance with the control channel numerology used by the UE. The UE may blind decode the control channel because unlike data channel transmissions, there may not be a previous downlink assignment with a control message that indicates the subcarrier spacing to be used by the UE.

In some examples, a UE (e.g., a UE 115 of the wireless communication system 100) may be configured to receive a control message in accordance with a selected control channel numerology. A base station may configure a UE to use a selected control channel numerology via RRC signaling, PDCCH signaling, or a message transmitted as part of a UE random access procedure. RRC signaling may be advantageous in that it is transmitted as data, and may be acknowledged (ACK'd) or non-acknowledged (NACK'd) by a UE. This may enable a base station to determine that the UE has received a control channel numerology configuration and is ready to receive control messages in accordance with the control channel numerology. In some examples, a UE may request or indicate a desired control channel numerology in a PUCCH transmission, or as part of (or in association with) channel quality indicator (CQI) feedback transmitted to a base station.

When a base station configures a UE to use a new control channel numerology via PDCCH signaling, the base station may not receive an acknowledgment (ACK) or a non-acknowledgement (NACK) from the UE indicating that the UE has received the new control channel numerology configuration. In these cases, the base station may continue to transmit control messages to the UE using a prior (or base) control channel numerology, or using the prior (or base) control channel numerology in addition to the new control channel numerology (e.g., duplicate control message may be transmitted to the UE), until such time that the UE confirms that it will receive control messages in accordance with the new control channel numerology.

In some examples, a base station may dynamically change a control channel numerology sequence (e.g., the base station may dynamically change the type or order of symbol periods used to transmit control messages on a control channel (e.g., from the control channel numerology sequence shown in FIG. 2, to the control channel numerology sequence shown in FIG. 3 or 4)). In these examples, the control channel numerology sequence may be changed (or indicated) on a subframe or per slot basis. A UE may need to perform hypothesis testing to determine the control channel numerology sequence used in a subframe; or when a UE is configured to use a certain control channel numerology, the UE may assume that all of the symbol periods of a control channel are configured in accordance with its configured control channel numerology, and the UE may perform a number of blind decodes to identify a symbol period that may contain a control message for the UE. In some examples, a UE may use reference signal (RS) detection to reduce control message search complexity (e.g., if the UE determines that the reference signals of a symbol period are not transmitted in the right locations (or using a format that coincides with its configured control channel numerology), the UE may cease decoding a symbol period and determine whether a next symbol period may contain a control message for the UE. In some examples, rules may be applied to reduce a UE's control message search space (e.g., symbol periods associated with a scaled control channel numerology (e.g., 2× or 4× a base subcarrier spacing) may occur within certain base symbol periods and not in other base symbol periods).

In some examples, a base station may semi-dynamically change a control channel numerology sequence. In these examples, the control channel numerology sequence is kept the same until the base station explicitly signals a change in the control channel numerology sequence. In some examples, a change in the control channel numerology sequence may be changed and/or indicated in a MIB or a SIB. When a base station explicitly signals (or signals a change in) its control channel numerology sequence, a UE may reduce its control message search space to symbol periods configured in accordance with the UE's control channel numerology.

In some examples, an indicator channel may be used to dynamically indicate a base station's control channel numerology sequence. In some examples, the indicator channel may be defined in a symbol period (e.g., an orthogonal frequency division multiplexing (OFDM) symbol period) having a relatively short duration and/or may carry relatively few bits of information. An indicator channel carrying relatively few bits of information may be less prone to the effects of inter-symbol interference (ISI) or inter-carrier interference (ICI). The numerology associated with the indicator channel may be static (i.e., fixed).

An indicator channel may indicate a base station's control channel numerology sequence for one or a plurality of symbol periods, for example. A UE may decode an indicator channel to bootstrap the control channel numerology of the next one or more symbol periods of a control channel.

In some examples, multiple indicator channels may be used, and in some examples, an indicator channel may be transmitted before the transmission of each symbol period of a control channel, to indicate the numerology of the next symbol period.

Figure 5:
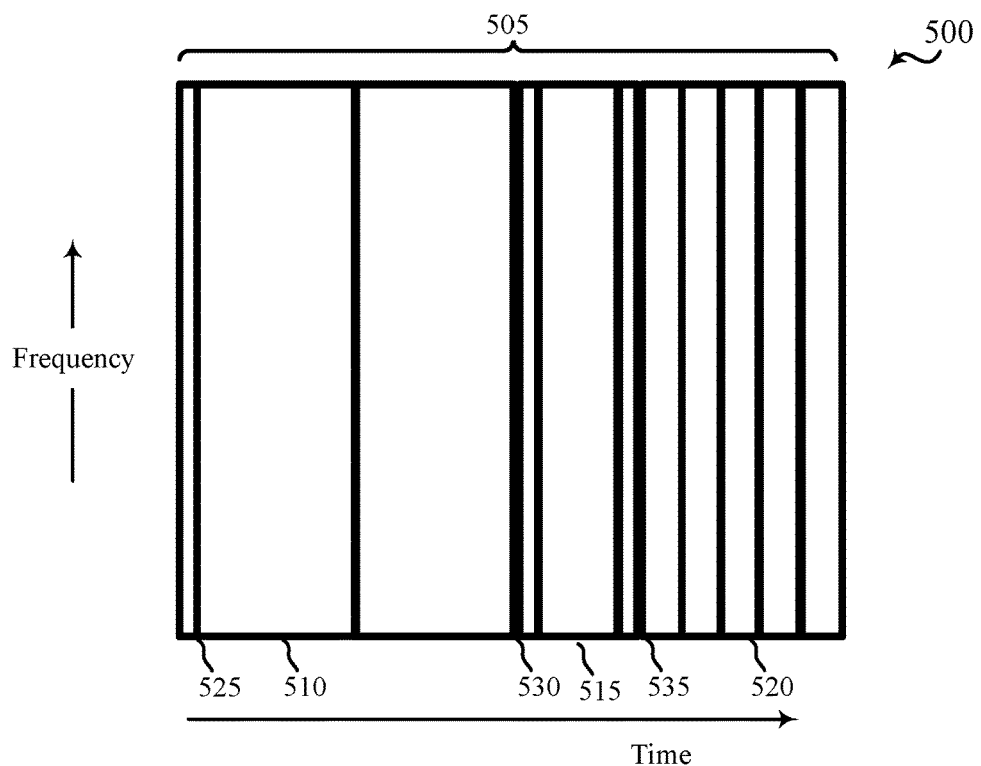
FIG. 5 shows a time and frequency representation of a control channel (or control region), in accordance with one or more aspects of the present disclosure.

FIG. 5 shows a time and frequency representation 500 of a control channel 505 (or control region), in accordance with various aspects of the present disclosure. The control channel 505 may include a plurality of symbol periods 510, 515, or 520. In some examples, the control channel 505 may be transmitted as part of a subframe (e.g., transmitted in the first one or more symbol periods of a subframe). By way of example, the control channel 505 is shown to include two base symbol periods 510, followed by a first scaled symbol period 515 having half the duration of the base symbol period 510, followed by five of a second symbol period 520 having one quarter the duration of the base symbol period 510. A base station may transmit control messages to one or more UEs on the control channel 505.

In FIG. 5, an indicator channel may be transmitted (e.g., from a base station to one or more UEs) before each change in the base station's control channel numerology sequence. Thus, a first indicator channel 525 is transmitted before the base symbol period 510, a second indicator channel 530 is transmitted before the first scaled symbol period 515, and a third indicator channel 535 is transmitted before the first of the second scaled symbol periods 520. A UE may assume that the base station's control channel numerology sequence remains constant until the UE receives a next-transmitted indicator channel.

Figure 6:
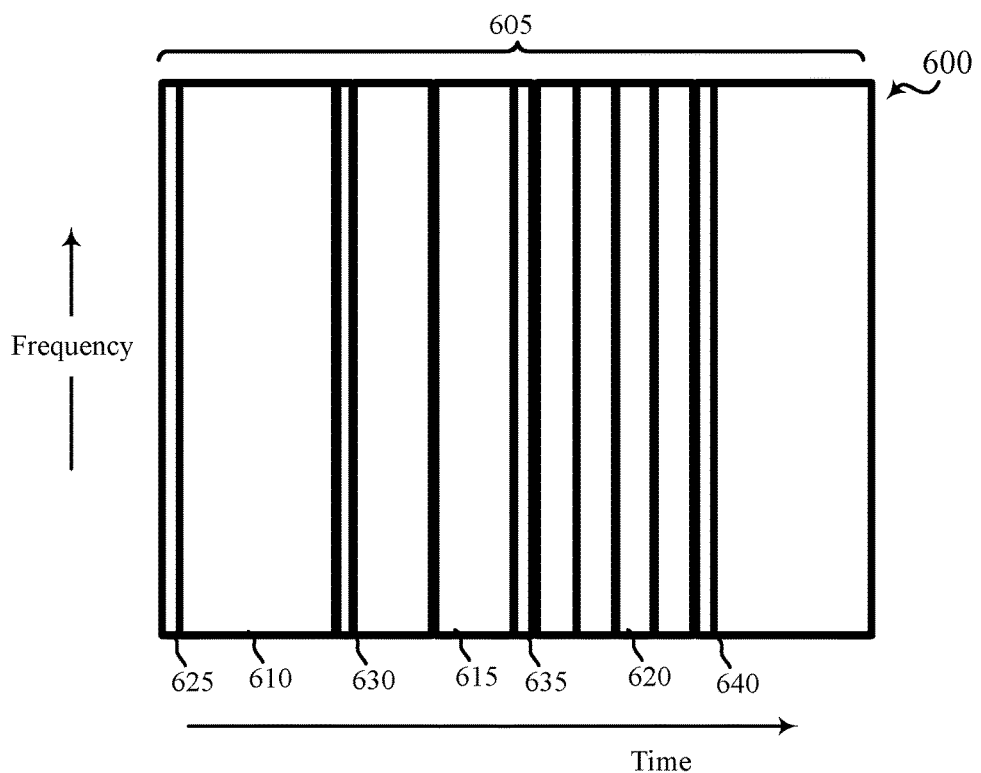
FIG. 6 shows a time and frequency representation of a control channel (or control region), in accordance with one or more aspects of the present disclosure.

FIG. 6 shows a time and frequency representation 600 of a control channel 605 (or control region), in accordance with various aspects of the present disclosure. The control channel 605 may include a plurality of symbol periods 610, 615, or 620. In some examples, the control channel 605 may be transmitted as part of a subframe (e.g., transmitted in the first one or more symbol periods of a subframe). By way of example, the control channel 605 is shown to include a base symbol period 610, followed by two of a first scaled symbol period 615 having half the duration of a base symbol period 610, followed by four of a second scaled symbol period 620 having one quarter the duration of a base symbol period 610, followed by another base symbol period 610. A base station may transmit control messages to one or more UEs on the control channel 605.

In FIG. 6, an indicator channel 625, 630, 635, or 640 may be transmitted (e.g., from a base station to one or more UEs) at a boundary of each real or virtual base symbol period 610 (where a virtual base symbol period is a base symbol period 610 that could have been transmitted if the base station had divided the control channel 605 into consecutive base symbol periods 610 instead of further dividing some base symbol periods into smaller scaled symbol periods). An advantage of the indicator channels transmitted within the control region 605, over the indicator channels transmitted within the control region 505, may be their fixed, periodic location, which may make it easier for UEs to find and decode the indicator channels, and enable a UE to enter a sleep state during a base symbol period that does not include one or more symbol periods configured in accordance with a UE's currently used control channel numerology.

Figure 7:
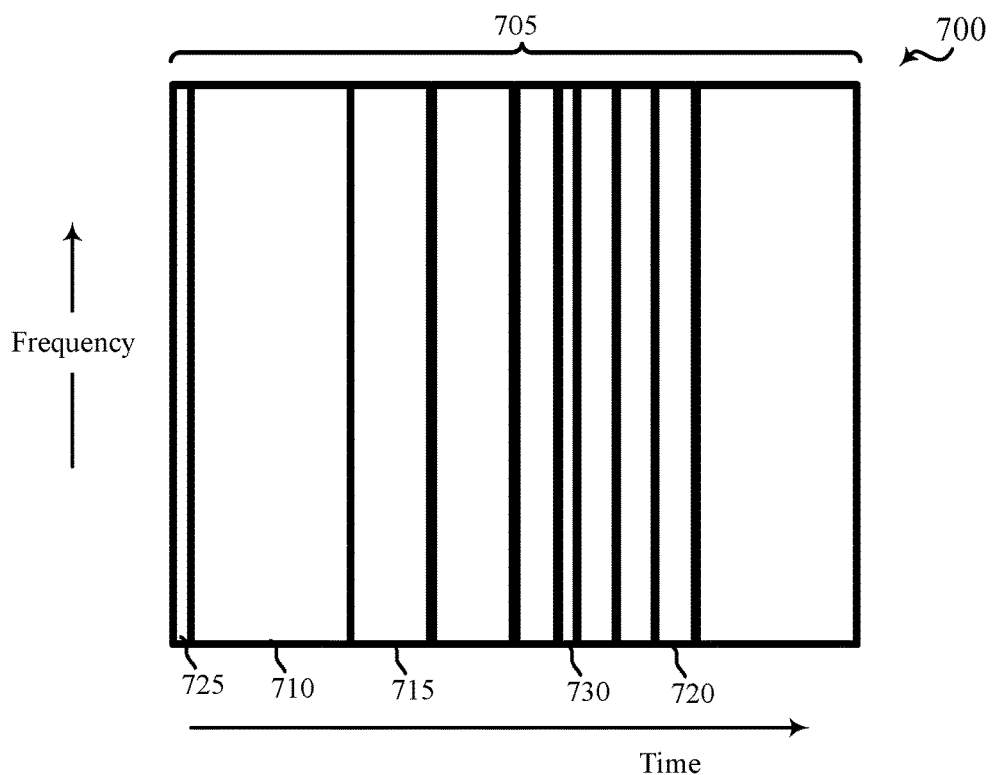
FIG. 7 shows a time and frequency representation of a control channel (or control region), in accordance with one or more aspects of the present disclosure.

FIG. 7 shows a time and frequency representation 700 of a control channel 705 (or control region), in accordance with various aspects of the present disclosure. The control channel 705 may include a plurality of symbol periods 710, 715, or 720. In some examples, the control channel 705 may be transmitted as part of a subframe (e.g., transmitted in the first one or more symbol periods of a subframe). By way of example, the control channel 705 is shown to include a base symbol period 710, followed by two of a first scaled symbol period 715 having half the duration of a base symbol period 710, followed by four of a second scaled symbol period 720 having one quarter the duration of a base symbol period 710, followed by another base symbol period 710. A base station may transmit control messages to one or more UEs on the control channel 705.

In FIG. 7, an indicator channel 725 or 730 is transmitted (e.g., from a base station to one or more UEs) before each of a number of groups of symbol periods. For example, an indicator channel 725 or 730 may be transmitted to indicate a control channel numerology sequence for a next four symbol periods of the control channel 705, or for a defined duration of symbol periods, or for an arbitrary number of symbol periods. An advantage of the indicator channels transmitted within the control region 705 is a reduction in the number of indicator channels transmitted (and received and decoded by UEs).

Figure 8:
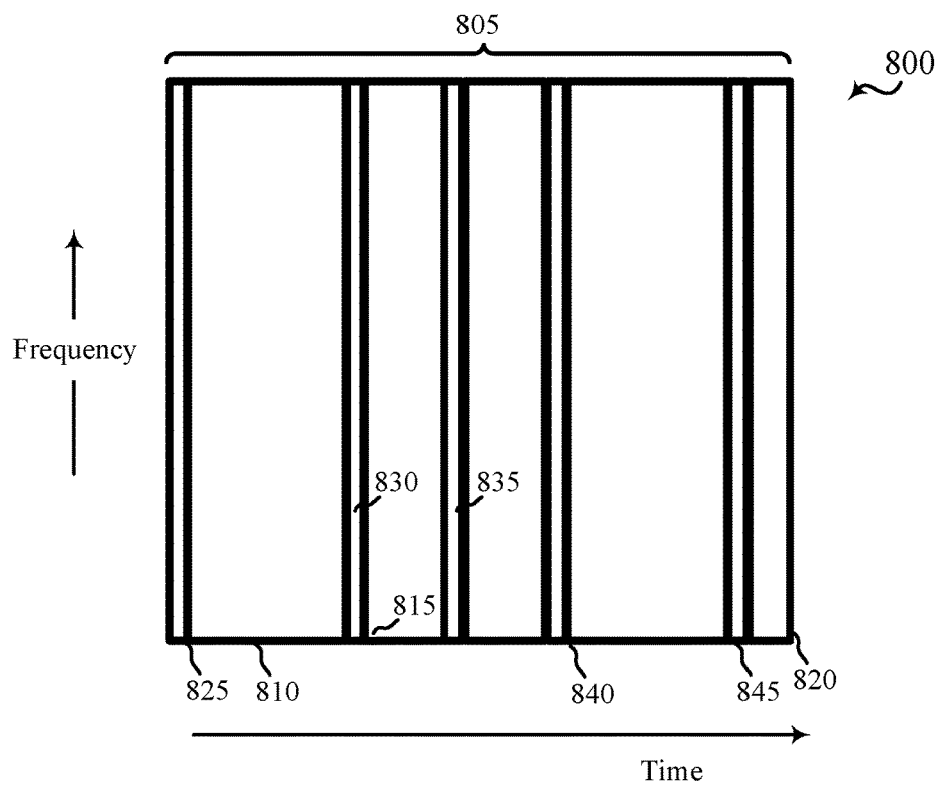
FIG. 8 shows a time and frequency representation of a control channel (or control region), in accordance with one or more aspects of the present disclosure.

FIG. 8 shows a time and frequency representation 800 of a control channel 805 (or control region), in accordance with various aspects of the present disclosure. The control channel 805 may include a plurality of symbol periods 810, 815, or 820. In some examples, the control channel 805 may be transmitted as part of a subframe (e.g., transmitted in the first one or more symbol periods of a subframe). By way of example, the control channel 805 is shown to include a base symbol period 810, followed by two of a first scaled symbol period 815 having half the duration of a base symbol period 810, followed by another base symbol period 810, followed by a second scaled symbol period 820 having one quarter the duration of a base symbol period 810. A base station may transmit control messages to one or more UEs on the control channel 805.

In FIG. 8, an indicator channel 825, 830, 835, 840, or 845 is transmitted (e.g., from a base station to one or more UEs) before each symbol period.

Figure 9:
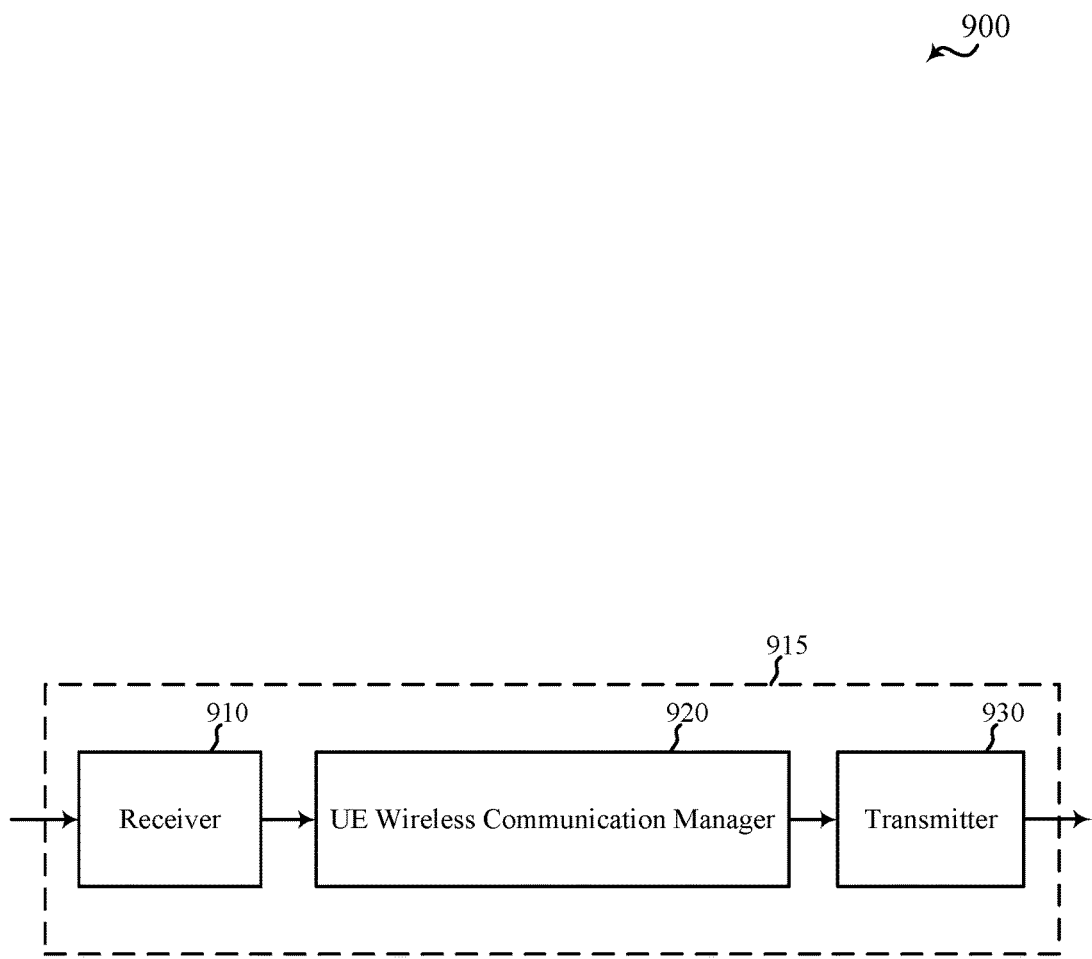
FIG. 9 shows a block diagram of an apparatus for wireless communication, in accordance with one or more aspects of the present disclosure.

FIG. 9 shows a block diagram 900 of an apparatus 915 for wireless communication, in accordance with various aspects of the present disclosure. The apparatus 915 may be an example of aspects of a UE 115 described with reference to FIG. 1. The apparatus 915 may include a receiver 910, a UE wireless communication manager 920, and a transmitter 930. The apparatus 915 may also include a processor. Each of these components may be in communication with each other.

The receiver 910 may receive information such as packets, user data, or control information associated with various information channels (e.g., control channels or data channels). Received information may be passed to other components of the apparatus 915, including the UE wireless communication manager 920. The receiver 910 may be an example of aspects of the UE transceiver(s) 1130 described with reference to FIG. 11. The receiver 910 may include or be associated with a single antenna or a plurality of antennas.

The UE wireless communication manager 920 may be used to manage one or more aspects of wireless communication for the apparatus 915. In some examples, part of the UE wireless communication manager 920 may be incorporated into or shared with the receiver 910 or the transmitter 930. The UE wireless communication manager 920 may be used to receive an indication of a control channel subcarrier spacing to be used by a UE including the apparatus; to configure the UE to use the control channel subcarrier spacing based on the indication; to receive a control message; and to decode at least a portion of the control message using the control channel subcarrier spacing. Additionally or alternatively, the UE wireless communication manager 920 may be used to receive an indicator channel identifying at least a subcarrier spacing to be used in one or more subsequent control channels; to decode the indicator channel; to receive the one or more subsequent control channels; and to decode the one or more subsequent control channels in accordance with the subcarrier spacing indicated by the indicator channel. The UE wireless communication manager 920 may also be used to perform various of the operations described with reference to FIG. 13 or 15. In some examples, the UE wireless communication manager 920 may be an example of the wireless communication manager 170 described with reference to FIG. 1.

The transmitter 930 may transmit signals received from other components of the apparatus 915, including the UE wireless communication manager 920. In some examples, the transmitter 930 may be collocated with the receiver 910 in a transceiver. The transmitter 930 may be an example of aspects of the UE transceiver(s) 1130 described with reference to FIG. 11. The transmitter 930 may include or be associated with a single antenna or a plurality of antennas.

Figure 10:
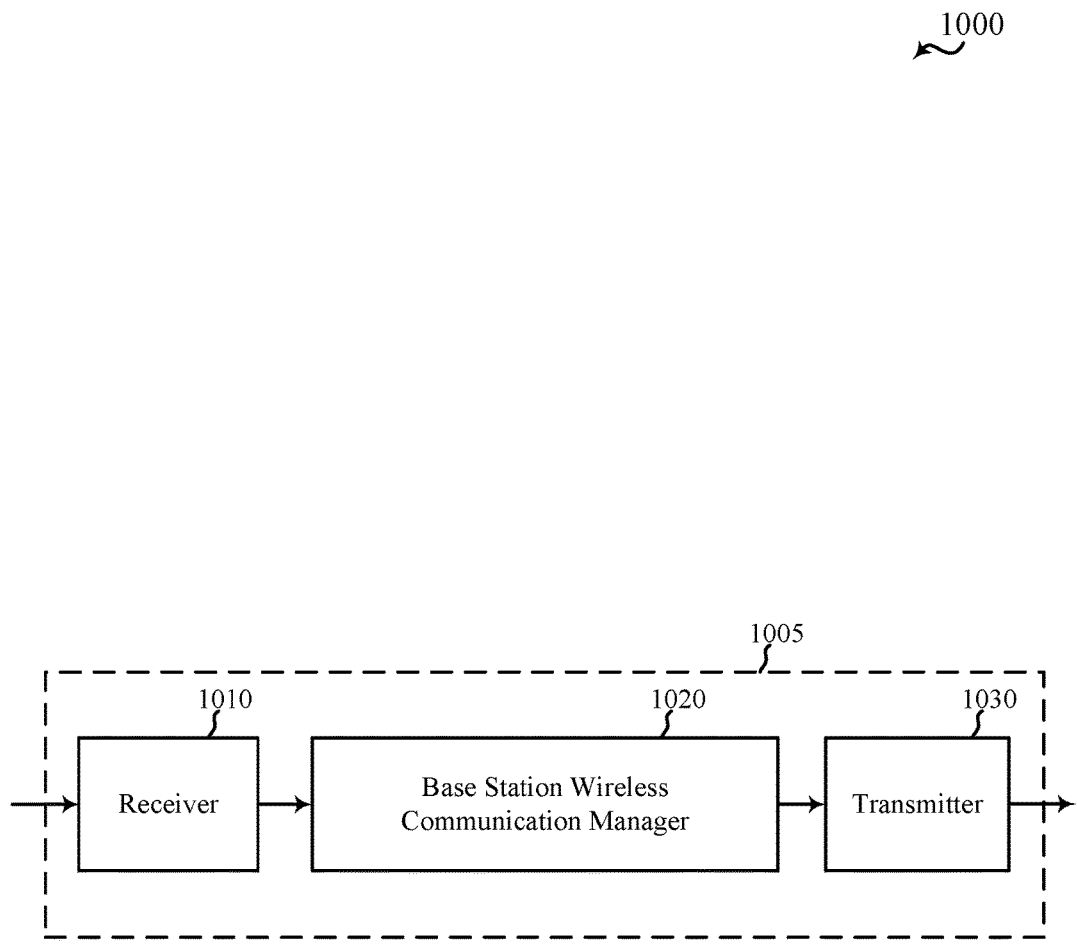
FIG. 10 shows a block diagram of an apparatus for wireless communication, in accordance with one or more aspects of the present disclosure.

FIG. 10 shows a block diagram 1000 of an apparatus 1005 for wireless communication, in accordance with various aspects of the present disclosure. The apparatus 1005 may be an example of aspects of a base station 105 described with reference to FIG. 1. The apparatus 1005 may include a receiver 1010, a base station wireless communication manager 1020, and a transmitter 1030. The apparatus 1005 may also include a processor. Each of these components may be in communication with each other.

The receiver 1010 may receive information such as packets, user data, or control information associated with various information channels (e.g., control channels or data channels). Received information may be passed to other components of the apparatus 1005, including the base station wireless communication manager 1020. The receiver 1010 may be an example of aspects of the base station transceiver(s) 1230 described with reference to FIG. 12. The receiver 1010 may include or be associated with a single antenna or a plurality of antennas.

The base station wireless communication manager 1020 may be used to manage one or more aspects of wireless communication for the apparatus 1005. In some examples, part of the base station wireless communication manager 1020 may be incorporated into or shared with the receiver 1010 or the transmitter 1030. The base station wireless communication manager 1020 may be used to transmit, to a UE, an indication of a control channel subcarrier spacing to be used by the UE; and to transmit a control message having a subcarrier spacing in accordance with the indication. Additionally or alternatively, the base station wireless communication manager 1020 may be used to transmit, to a UE, an indicator channel identifying at least a subcarrier spacing to be used in one or more subsequent control channels; and to transmit the one or more subsequent control channels in accordance with the subcarrier spacing indicated by the indicator channel. The base station wireless communication manager 1020 may also be used to perform various of the operations described with reference to FIG. 14 or 16. In some examples, the base station wireless communication manager 1020 may be an example of the wireless communication manager 175 described with reference to FIG. 1.

The transmitter 1030 may transmit signals received from other components of the apparatus 1015, including the base station wireless communication manager 1020. In some examples, the transmitter 1030 may be collocated with the receiver 1010 in a transceiver. The transmitter 1030 may be an example of aspects of the UE transceiver(s) 1230 described with reference to FIG. 12. The transmitter 1030 may include or be associated with a single antenna or a plurality of antennas.

Figure 11:
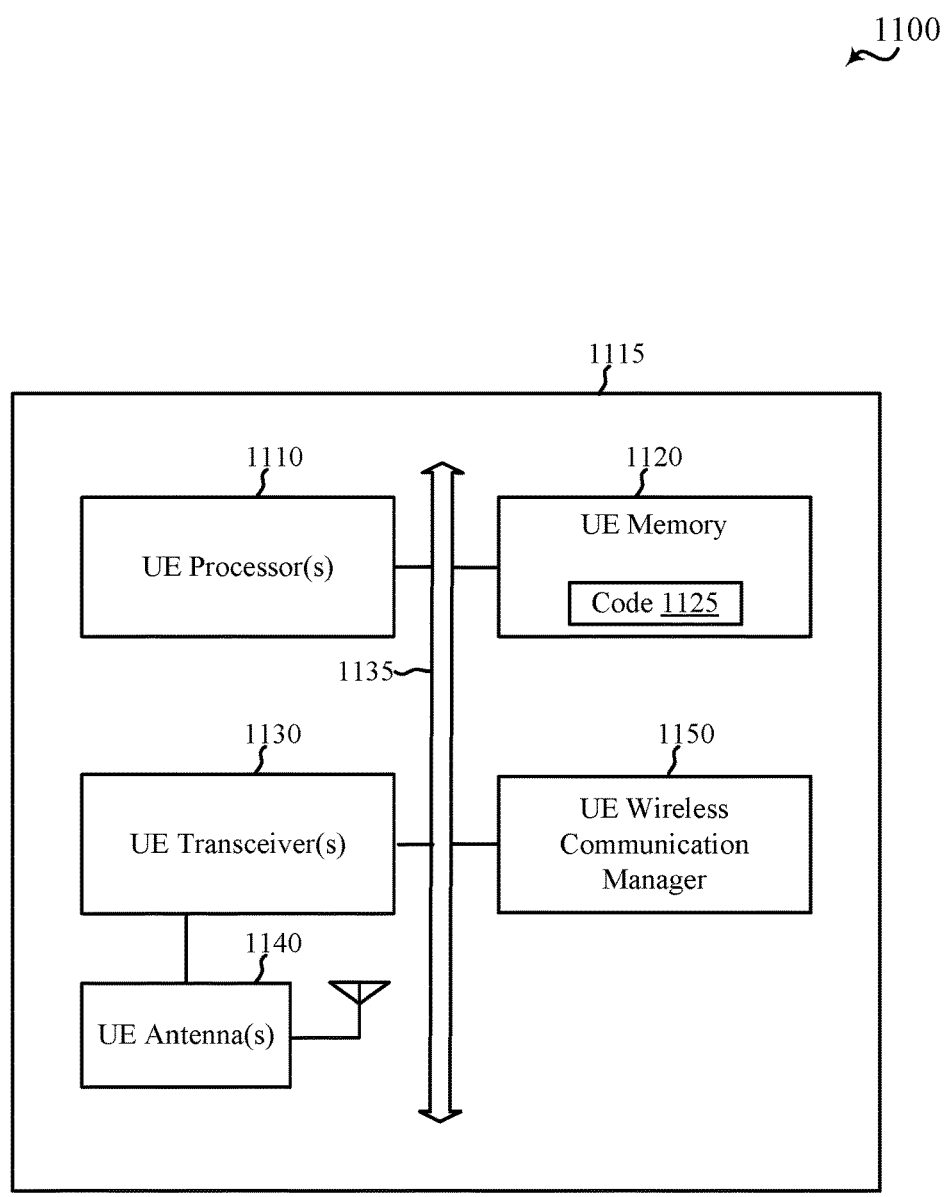
FIG. 11 shows a block diagram of a UE for use in wireless communication, in accordance with one or more aspects of the present disclosure.

FIG. 11 shows a block diagram 1100 of a UE 1115 for use in wireless communication, in accordance with various aspects of the present disclosure. The UE 1115 may be include or be part of a personal computer (e.g., a laptop computer, a netbook computer, a tablet computer, etc.), a cellular telephone, a smart phone, a PDA, a DVR, an internet appliance, a gaming console, an e-reader, etc. The UE 1115 may, in some examples, have an internal power supply (not shown), such as a small battery, to facilitate mobile operation. In some examples, the UE 1115 may be an example of aspects of one or more of the UEs 115 described with reference to FIG. 1, or aspects of the apparatus 915 described with reference to FIG. 9. The UE 1115 may be configured to implement at least some of the UE or apparatus techniques and functions described with reference to other figures.

The UE 1115 may include at least one processor (represented by UE processor(s) 1110), a UE memory 1120, at least one UE transceiver (represented by UE transceiver(s) 1130), at least one antenna (represented by UE antenna(s) 1140), or a UE wireless communication manager 1150. Each of these components may be in communication with each other, directly or indirectly, over one or more buses 1165.

The UE memory 1120 may include random access memory (RAM) or read-only memory (ROM). The UE memory 1120 may store computer-readable, computer-executable code 1125 containing instructions that are configured to, when executed, cause the UE processor(s) 1110 to perform various functions described herein related to wireless communication. Alternatively, the computer-executable code 1125 may not be directly executable by the UE processor(s) 1110 but be configured to cause the UE 1115 (e.g., when compiled and executed) to perform various of the functions described herein.

The UE processor(s) 1110 may include one or more intelligent hardware devices, (e.g., a central processing unit (CPU), a microcontroller, an ASIC, etc.). The UE processor(s) 1110 may process information received through the UE transceiver(s) 1130 or information to be sent to the UE transceiver(s) 1130 for transmission through the UE antenna(s) 1140. The UE processor(s) 1110 may handle, alone or in connection with the UE wireless communication manager 1150, various aspects of communicating over (or managing communications over) one or more radio frequency spectrum bands.

The UE transceiver(s) 1130 may be configured to modulate packets and provide the modulated packets to the UE antenna(s) 1140 for transmission. The UE transceiver(s) 1130 may also demodulate packets received from the UE antenna(s) 1140. The UE transceiver(s) 1130 may, in some examples, be implemented as one or more UE transmitters and one or more separate UE receivers. The UE transceiver(s) 1130 may be configured to communicate bi-directionally, via the UE antenna(s) 1140, with one or more access points (e.g., eNBs, base stations, etc.). While the UE 1115 may include a single antenna, there may be examples in which the UE 1115 may include multiple antennas.

The UE wireless communication manager 1150 may be configured to coordinate or manage wireless communications for the UE 1115. The UE wireless communication manager 1150, or portions of it, may include a processor, or some or all of the functions of the UE wireless communication manager 1150 may be performed by one or more of the UE processor(s) 1110 or in connection with the UE processor(s) 1110. In some examples, the UE wireless communication manager 1150 may be an example of the wireless communication manager 170 or 920 described with reference to FIG. 1 or 9.

Figure 12:
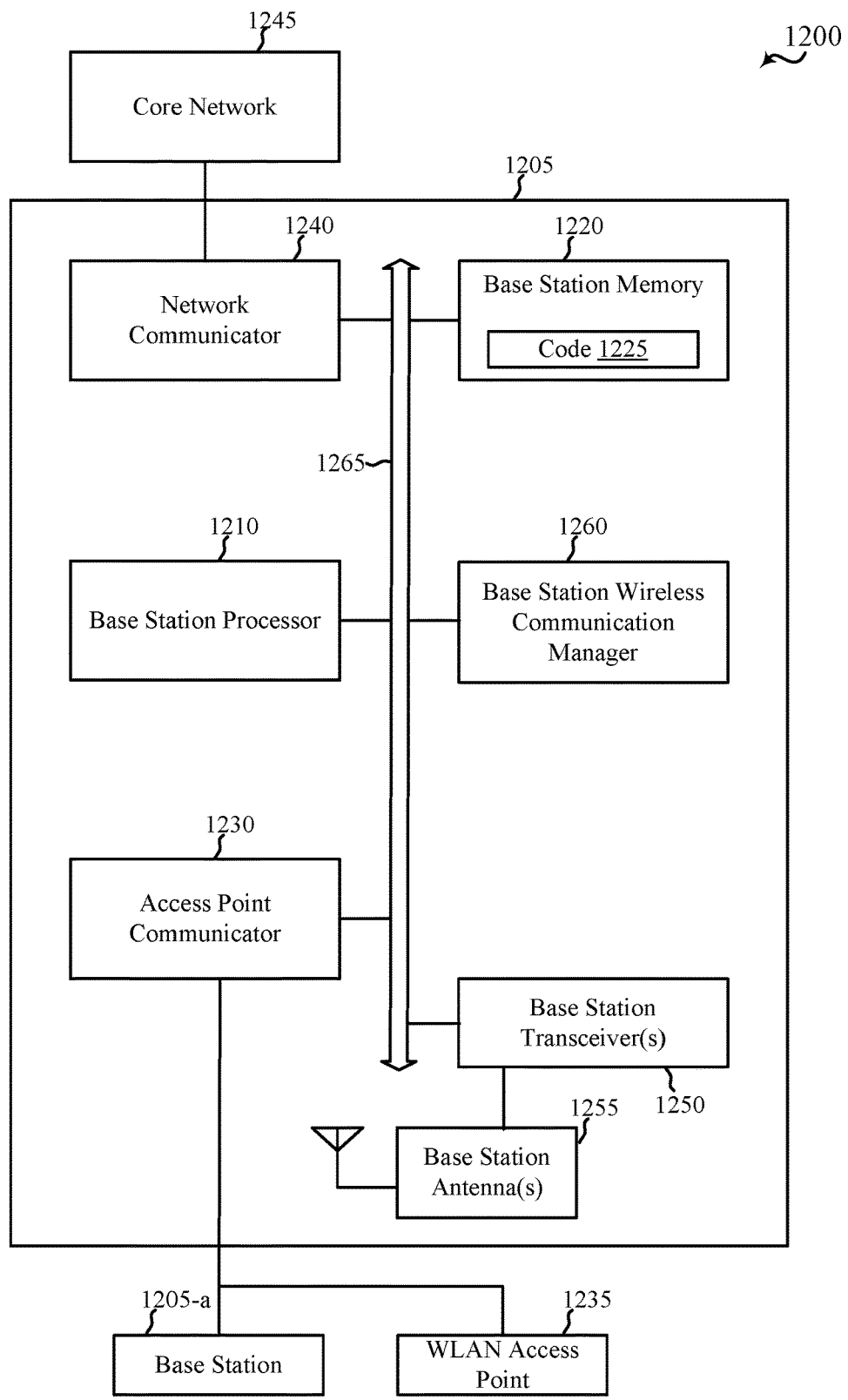
FIG. 12 shows a block diagram of a base station (e.g., a base station forming part or all of an eNB) for use in wireless communication, in accordance with one or more aspects of the present disclosure.

FIG. 12 shows a block diagram 1200 of a base station 1205 (e.g., a base station forming part or all of an eNB) for use in wireless communication, in accordance with various aspects of the present disclosure. In some examples, the base station 1205 may be an example of aspects of one or more of the base stations 105 described with reference to FIG. 1, or aspects of the apparatus 1005 described with reference to FIG. 10. The base station 1205 may be configured to implement or facilitate at least some of the base station techniques and functions described with reference to other figures.

The base station 1205 may include a base station processor 1210, a base station memory 1220, at least one base station transceiver (represented by base station transceiver(s) 1250), at least one base station antenna (represented by base station antenna(s) 1255), or a base station wireless communication manager 1260. The base station 1205 may also include one or more of an access point communicator 1230 or a network communicator 1240. Each of these components may be in communication with each other, directly or indirectly, over one or more buses 1265.

The base station memory 1220 may include RAM or ROM. The base station memory 1220 may store computer-readable, computer-executable code 1225 containing instructions that are configured to, when executed, cause the base station processor 1210 to perform various functions described herein related to wireless communication. Alternatively, the computer-executable code 1225 may not be directly executable by the base station processor 1210 but be configured to cause the base station 1205 (e.g., when compiled and executed) to perform various of the functions described herein.

The base station processor 1210 may include an intelligent hardware device, (e.g., a CPU, a microcontroller, an ASIC, etc.). The base station processor 1210 may process information received through the base station transceiver(s) 1250, the access point communicator 1230, or the network communicator 1240. The base station processor 1210 may also process information to be sent to the transceiver(s) 1250 for transmission through the antenna(s) 1255, to the access point communicator 1230, for transmission to one or more other access points (e.g., base station 1205-*a* or WLAN access point 1235), or to the network communicator 1240 for transmission to a core network 1245, which may be an example of one or more aspects of the core network 130 described with reference to FIG. 1. The base station processor 1210 may handle, alone or in connection with the base station wireless communication manager 1260, various aspects of communicating over (or managing communications over) one or more radio frequency spectrum bands.

The base station transceiver(s) 1250 may include a modem configured to modulate packets and provide the modulated packets to the base station antenna(s) 1255 for transmission, and to demodulate packets received from the base station antenna(s) 1255. The base station transceiver(s) 1250 may, in some examples, be implemented as one or more base station transmitters and one or more separate base station receivers. The base station transceiver(s) 1250 may be configured to communicate bi-directionally, via the antenna(s) 1255, with one or more UEs or apparatuses, such as one or more of the UEs 115 or 915 described with reference to FIG. 1 or 9, or one of the apparatus 1005 described with reference to FIG. 10. The base station 1205 may, for example, include multiple base station antennas 1255 (e.g., an antenna array). The base station 1205 may communicate with the core network 1245 through the network communicator 1240. The base station 1205 may also communicate with other access points, such as the base station 1205-*a* and the WLAN access point 1235, using the access point communicator 1230.

The base station wireless communication manager 1260 may be configured to perform or control some or all of the base station techniques or functions described with reference to other figures. The base station wireless communication manager 1260, or portions of it, may include a processor, or some or all of the functions of the base station wireless communication manager 1260 may be performed by the base station processor 1210 or in connection with the base station processor 1210. In some examples, the base station wireless communication manager 1260 may be an example of the wireless communication manager 175 or 1020 described with reference to FIG. 1 or 10.

Figure 13:
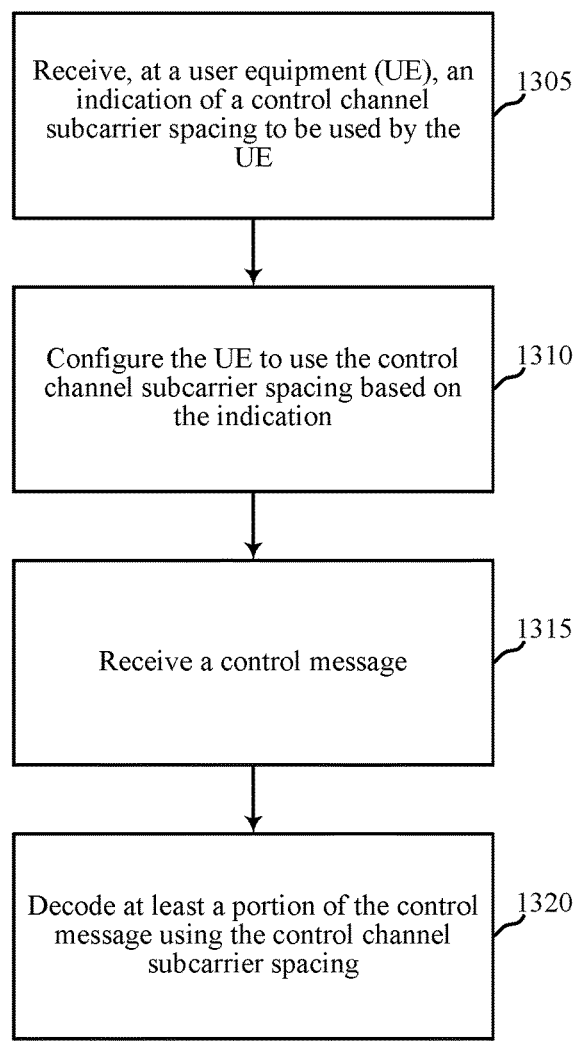
FIG. 13 is a flow chart illustrating an example of a method for wireless communication at a UE, in accordance with one or more aspects of the present disclosure.

FIG. 13 is a flow chart illustrating an example of a method 1300 for wireless communication at a UE, in accordance with various aspects of the present disclosure. For clarity, the method 1300 is described below with reference to aspects of one or more of the UEs 115 or 1115 described with reference to FIG. 1 or 11, or aspects of the apparatus 915 described with reference to FIG. 9. In some examples, a UE may execute one or more sets of codes to control the functional elements of the UE to perform the functions described below. Additionally or alternatively, the UE may perform one or more of the functions described below using special-purpose hardware.

At block 1305, the method 1300 may include receiving, at a UE, an indication of a control channel subcarrier spacing to be used by the UE. In some examples, the indication may be UE-specific. In some examples, receiving the indication may include receiving the indication via RRC signaling, or receiving the indication via PDCCH signaling, or receiving the indication via a UE random access procedure, or receiving the indication in response to a request by the UE. In some examples, the request may be included in a PUCCH or in CQI feedback. The operation(s) at block 1305 may be performed using the wireless communication manager 170, 920, or 1150 described with reference to FIG. 1, 9, or 11.

At block 1310, the method 1300 may include configuring the UE to use the control channel subcarrier spacing based on the indication. The operation(s) at block 1310 may be performed using the wireless communication manager 170, 920, or 1150 described with reference to FIG. 1, 9, or 11.

At block 1315, the method 1300 may include receiving a control message. In some examples, the control message may be configured with both the control channel subcarrier spacing indicated by the indication and a previous control channel subcarrier spacing. The operation(s) at block 1315 may be performed using the wireless communication manager 170, 920, or 1150 described with reference to FIG. 1, 9, or 11.

At block 1320, the method 1300 may include decoding at least a portion of the control message using the control channel subcarrier spacing. In some examples, decoding at least the portion of the control message may include blindly decoding the control message using the control channel subcarrier spacing, or decoding the control message in accordance to predefined rules regarding a sequence of control channel subcarrier spacing in the control message. In some examples, the method may include performing RS detection to reduce a complexity of the decoding. The operation(s) at block 1320 may be performed using the wireless communication manager 170, 920, or 1150 described with reference to FIG. 1, 9, or 11.

In some examples of the method 1300, a sequence of control channel subcarrier spacing of the control message may be changed dynamically. In some examples, a sequence of control channel subcarrier spacing of the control message may be changed semi-dynamically. In some examples, the method 1300 may include receiving a sequence indication, indicating a sequence of control channel subcarrier spacing of the control message. In some examples, the sequence indication may be received via a MIB or a SIB.

Figure 14:
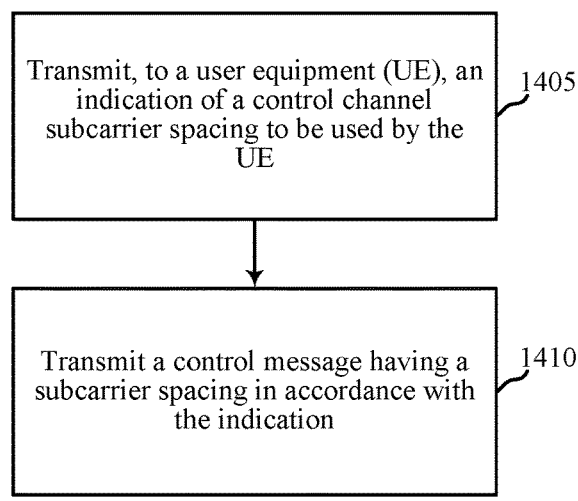
FIG. 14 is a flow chart illustrating an example of a method for wireless communication at a base station, in accordance with one or more aspects of the present disclosure.

FIG. 14 is a flow chart illustrating an example of a method 1400 for wireless communication at a base station, in accordance with various aspects of the present disclosure. For clarity, the method 1400 is described below with reference to aspects of one or more of the base stations 105 or 1205 described with reference to FIG. 1 or 12, or aspects of the apparatus 1005 described with reference to FIG. 10. In some examples, a base station may execute one or more sets of codes to control the functional elements of the base station to perform the functions described below. Additionally or alternatively, the base station may perform one or more of the functions described below using special-purpose hardware.

At block 1405, the method 1400 may include transmitting, to a UE, an indication of a control channel subcarrier spacing to be used by the UE. In some examples, the indication may be UE-specific. In some examples, transmitting the indication may include transmitting the indication via RRC signaling, or transmitting the indication via PDCCH signaling, or transmitting the indication via a UE random access procedure, or transmitting the indication in response to a request by the UE. In some examples, the request may be received in a PUCCH or in CQI feedback. The operation(s) at block 1405 may be performed using the wireless communication manager 175, 1020, or 1260 described with reference to FIG. 1, 10, or 12.

At block 1410, the method 1400 may include transmitting a control message having a subcarrier spacing in accordance with the indication. In some examples, the control message may be configured with both the control channel subcarrier spacing indicated by the indication and a previous control channel subcarrier spacing. The operation(s) at block 1410 may be performed using the wireless communication manager 175, 1020, or 1260 described with reference to FIG. 1, 10, or 12.

In some examples, the method 1400 may include changing a sequence of control channel subcarrier spacing of the control message dynamically. In some examples, the method 1400 may include changing a sequence of control channel subcarrier spacing of the control message semi-dynamically. In some examples, the method 1400 may include transmitting a sequence indication, indicating a sequence of control channel subcarrier spacing of the control message. In some examples, the sequence indication may be transmitted via a MIB or a SIB.

Figure 15:
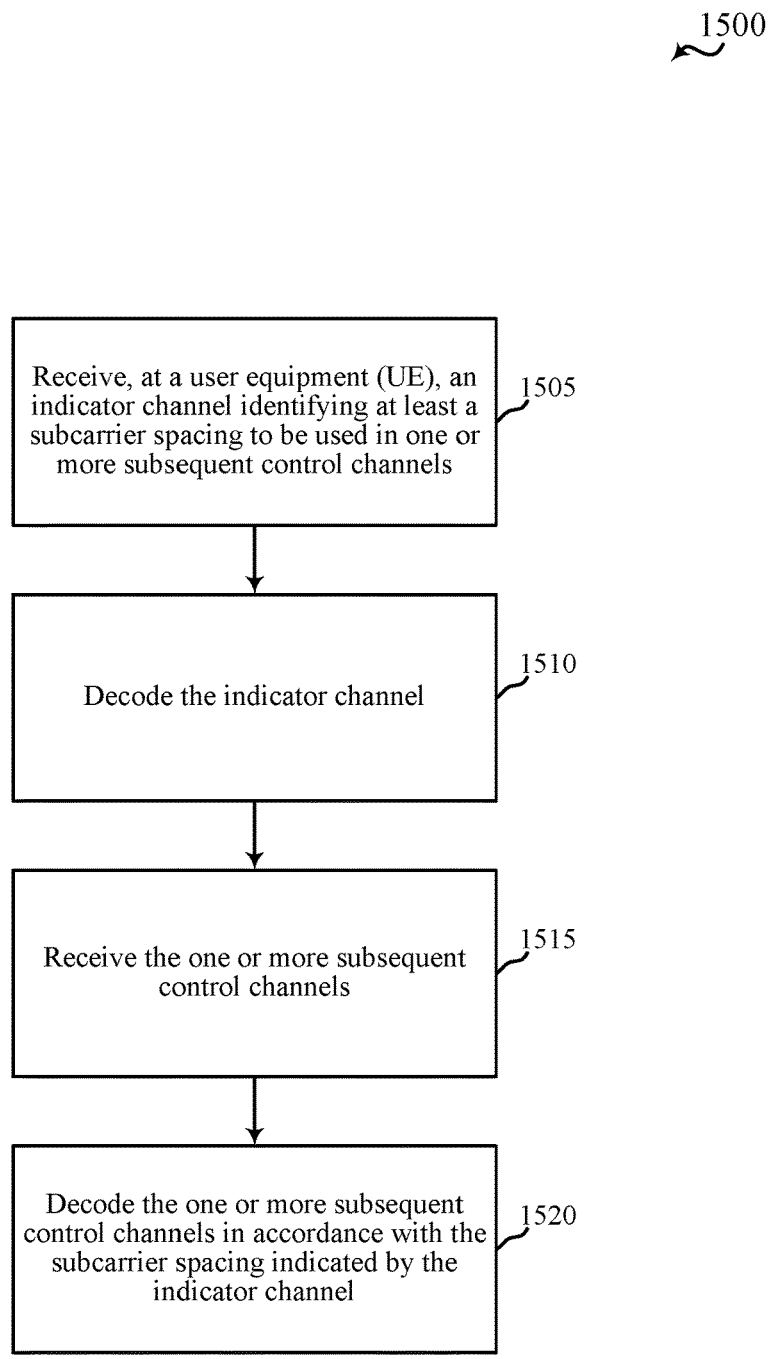
FIG. 15 is a flow chart illustrating an example of a method for wireless communication at a UE, in accordance with one or more aspects of the present disclosure.

FIG. 15 is a flow chart illustrating an example of a method 1500 for wireless communication at a UE, in accordance with various aspects of the present disclosure. For clarity, the method 1500 is described below with reference to aspects of one or more of the UEs 115 or 1115 described with reference to FIG. 1 or 11, or aspects of the apparatus 915 described with reference to FIG. 9. In some examples, a UE may execute one or more sets of codes to control the functional elements of the UE to perform the functions described below. Additionally or alternatively, the UE may perform one or more of the functions described below using special-purpose hardware.

At block 1505, the method 1500 may include receiving, at a UE, an indicator channel identifying at least a subcarrier spacing to be used in one or more subsequent control channels. In some examples, the subcarrier spacing of the indicator channel may be fixed. In some examples, the indicator channel may be received at a boundary of a base subcarrier spacing, wherein the base subcarrier spacing is predefined and constant. In some examples, the indicator channel may be received before each switch in control channel subcarrier spacing. In some examples, the indicator channel may further indicate a sequence of subcarrier spacing to be used in the one or more subsequent control channels. In some examples, the indicator channel may be received before a start of each symbol in the one or more control channels. The operation(s) at block 1505 may be performed using the wireless communication manager 170, 920, or 1150 described with reference to FIG. 1, 9, or 11.

At block 1510, the method 1500 may include decoding the indicator channel. The operation(s) at block 1510 may be performed using the wireless communication manager 170, 920, or 1150 described with reference to FIG. 1, 9, or 11.

At block 1515, the method 1500 may include receiving the one or more subsequent control channels. The operation(s) at block 1515 may be performed using the wireless communication manager 170, 920, or 1150 described with reference to FIG. 1, 9, or 11.

At block 1520, the method 1500 may include decoding the one or more subsequent control channels in accordance with the subcarrier spacing indicated by the indicator channel. The operation(s) at block 1520 may be performed using the wireless communication manager 170, 920, or 1150 described with reference to FIG. 1, 9, or 11.

In some examples of the method 1500, a sequence of control channel subcarrier spacing of the control message may be changed dynamically. In some examples, a sequence of control channel subcarrier spacing of the control message may be changed semi-dynamically. In some examples, the method 1300 may include receiving a sequence indication, indicating a sequence of control channel subcarrier spacing of the control message. In some examples, the sequence indication may be received via a MIB or a SIB.

Figure 16:
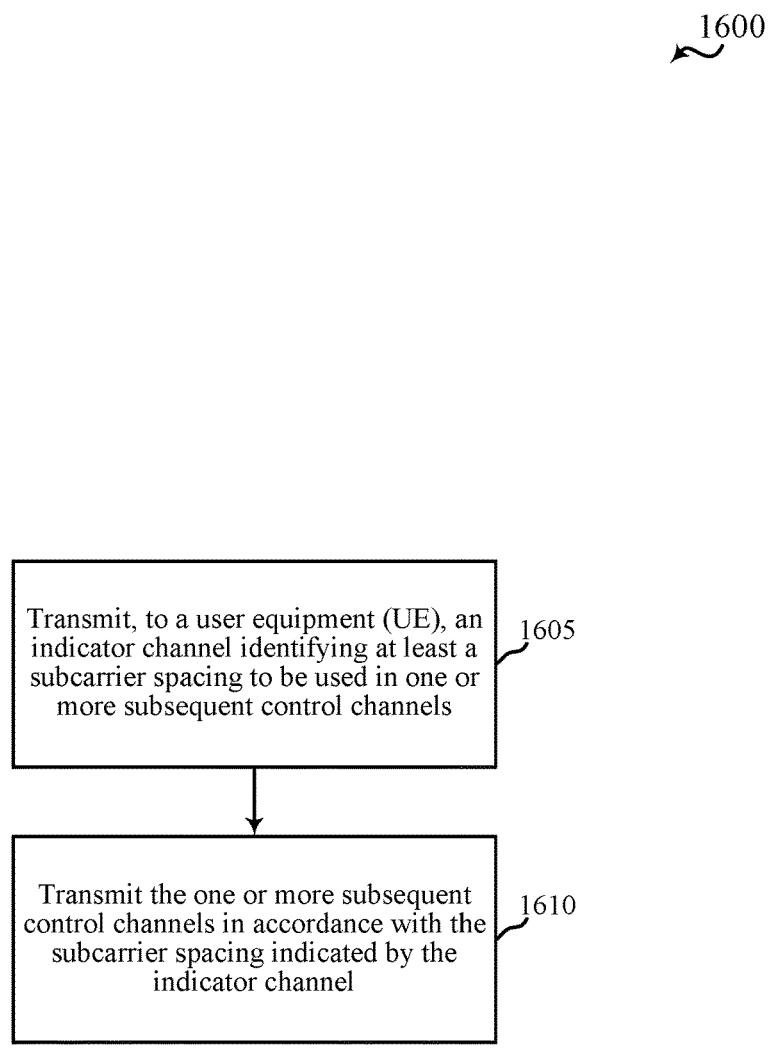
FIG. 16 is a flow chart illustrating an example of a method for wireless communication at a base station, in accordance with one or more aspects of the present disclosure.

FIG. 16 is a flow chart illustrating an example of a method 1600 for wireless communication at a base station, in accordance with various aspects of the present disclosure. For clarity, the method 1600 is described below with reference to aspects of one or more of the base stations 105 or 1205 described with reference to FIG. 1 or 12, or aspects of the apparatus 1005 described with reference to FIG. 10. In some examples, a base station may execute one or more sets of codes to control the functional elements of the base station to perform the functions described below. Additionally or alternatively, the base station may perform one or more of the functions described below using special-purpose hardware.

At block 1605, the method 1600 may include transmitting, to a UE, an indicator channel identifying at least a subcarrier spacing to be used in one or more subsequent control channels. In some examples, the subcarrier spacing of the indicator channel may be fixed. In some examples, the indicator channel may be transmitted at a boundary of a base subcarrier spacing, wherein the base subcarrier spacing is predefined and constant. In some examples, the indicator channel may be transmitted before each switch in control channel subcarrier spacing. In some examples, the indicator channel may further indicate a sequence of subcarrier spacing to be used in the one or more subsequent control channels. In some examples, the indicator channel may be transmitted before a start of each symbol in the one or more control channels. The operation(s) at block 1605 may be performed using the wireless communication manager 175, 1020, or 1260 described with reference to FIG. 1, 10, or 12.

At block 1610, the method 1600 may include transmitting the one or more subsequent control channels in accordance with the subcarrier spacing indicated by the indicator channel. The operation(s) at block 1610 may be performed using the wireless communication manager 175, 1020, or 1260 described with reference to FIG. 1, 10, or 12.

The methods 1300, 1400, 1500, and 1600 described with reference to FIGS. 13, 14, 15, and 16 may provide for wireless communication. It should be noted that the methods 1300, 1400, 1500, and 1600 are just example implementations, and the operations of the methods 1300, 1400, 1500, and 1600 may be rearranged or otherwise modified such that other implementations are possible. In some examples, aspects of the methods 1300 and 1500 may be combined. In some examples, aspects of the methods 1400 and 1600 may be combined.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes a LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication, comprising:
transmitting, via a master information block (MIB) or a system information block (SIB) to a user equipment (UE), an indication of a change in a sequence of a control channel subcarrier spacing to be used by the UE; and
transmitting a control message having a subcarrier spacing in accordance with the indication.

2. The method of claim 1, wherein the indication is UE-specific.

3. The method of claim 1, wherein transmitting the indication comprises:
transmitting the indication via radio resource control (RRC) signaling.

4. A method for wireless communication, comprising:
transmitting, to a user equipment (UE), an indication of a control channel subcarrier spacing to be used by the UE; and
transmitting a control message having a subcarrier spacing in accordance with the indication;
wherein transmitting the indication comprises:
transmitting the indication via physical downlink control channel (PDCCH) signaling, and wherein the control message is configured with both the control channel subcarrier spacing indicated by the indication and a previous control channel subcarrier spacing.

5. A method for wireless communication, comprising:
transmitting, to a user equipment (UE), an indication of a control channel subcarrier spacing to be used by the UE; and
transmitting a control message having a subcarrier spacing in accordance with the indication;
wherein transmitting the indication comprises:
transmitting the indication via a UE random access procedure.

6. A method for wireless communication, comprising:
transmitting, to a user equipment (UE), an indication of a control channel subcarrier spacing to be used by the UE; and
transmitting a control message having a subcarrier spacing in accordance with the indication;
wherein transmitting the indication comprises:
transmitting the indication in response to a request by the UE; and
receiving the request in a physical uplink control channel (PUCCH) or in channel quality information (CQI) feedback.

7. A method for wireless communication, comprising:
transmitting, to a user equipment (UE), an indication of a change in a sequence of control channel subcarrier spacing on a per slot basis to be used by the UE; and
transmitting a control message having a subcarrier spacing in accordance with the indication.

8. A method for wireless communication, comprising:
receiving, via a master information block (MIB) or a system information block (SIB) at a user equipment (UE), an indication of a change in a sequence of a control channel subcarrier spacing to be used by the UE;
configuring the UE to use the control channel subcarrier spacing based on the indication;
receiving a control message; and
decoding at least a portion of the control message using the control channel subcarrier spacing.

9. The method of claim 8, wherein the indication is UE-specific.

10. The method of claim 8, wherein receiving the indication comprises:
receiving the indication via radio resource control (RRC) signaling.

11. A method for wireless communication, comprising:
receiving, at a user equipment (UE), an indication of a control channel subcarrier spacing to be used by the UE;
configuring the UE to use the control channel subcarrier spacing based on the indication;
receiving a control message; and
decoding at least a portion of the control message using the control channel subcarrier spacing;
wherein receiving the indication comprises:
receiving the indication via physical downlink control channel (PDCCH) signaling, wherein the control message is configured with both the control channel subcarrier spacing indicated by the indication and a previous control channel subcarrier spacing.

12. A method for wireless communication, comprising:
receiving, at a user equipment (UE), an indication of a control channel subcarrier spacing to be used by the UE;
configuring the UE to use the control channel subcarrier spacing based on the indication;
receiving a control message; and
decoding at least a portion of the control message using the control channel subcarrier spacing;
wherein receiving the indication comprises:
receiving the indication via a UE random access procedure.

13. A method for wireless communication, comprising:
receiving, at a user equipment (UE), an indication of a control channel subcarrier spacing to be used by the UE;
configuring the UE to use the control channel subcarrier spacing based on the indication;
receiving a control message; and
decoding at least a portion of the control message using the control channel subcarrier spacing;
wherein receiving the indication comprises:
receiving the indication in response to a request by the UE; and
including the request in a physical uplink control channel (PUCCH) or in channel quality information (CQI) feedback.

14. A method for wireless communication, comprising:
receiving, at a user equipment (UE), an indication of a control channel subcarrier spacing to be used by the UE;
configuring the UE to use the control channel subcarrier spacing based on the indication;
receiving a control message; and
decoding at least a portion of the control message using the control channel subcarrier spacing;
wherein decoding at least the portion of the control message comprises:
blindly decoding the control message using the control channel subcarrier spacing.

15. A method for wireless communication, comprising:
receiving, at a user equipment (UE), an indication of a control channel subcarrier spacing to be used by the UE;
configuring the UE to use the control channel subcarrier spacing based on the indication;
receiving a control message; and
decoding at least a portion of the control message using the control channel subcarrier spacing;
wherein decoding at least the portion of the control message comprises:
decoding the control message in accordance to predefined rules regarding a sequence of control channel subcarrier spacing in the control message.

16. A method for wireless communication, comprising:
receiving, at a user equipment (UE), an indication of a change in a sequence of control channel subcarrier spacing on a per slot basis to be used by the UE;
configuring the UE to use the control channel subcarrier spacing based on the indication;
receiving a control message; and
decoding at least a portion of the control message using the control channel subcarrier spacing.

17. A method for wireless communication, comprising:
receiving, at a user equipment (UE), an indication of a control channel subcarrier spacing to be used by the UE;
configuring the UE to use the control channel subcarrier spacing based on the indication;
receiving a control message; and
decoding at least a portion of the control message using the control channel subcarrier spacing;
wherein the control message includes multiple portions using different control channel subcarrier spacing within a single slot;
wherein the multiple portions using different control channel subcarrier spacing each correspond to different UEs.

18. A method for wireless communication, comprising:
transmitting, to a user equipment (UE), an indicator channel identifying at least a subcarrier spacing to be used in one or more subsequent control channels; and
transmitting the one or more subsequent control channels in accordance with the subcarrier spacing indicated by the indicator channel;
wherein the indicator channel is transmitted at a boundary of a base subcarrier spacing, wherein the base subcarrier spacing is predefined and constant.

19. A method for wireless communication, comprising:
transmitting, to a user equipment (UE), an indicator channel identifying at least a subcarrier spacing to be used in one or more subsequent control channels; and
transmitting the one or more subsequent control channels in accordance with the subcarrier spacing indicated by the indicator channel;
wherein the indicator channel is transmitted before each switch in control channel subcarrier spacing.

20. A method for wireless communication, comprising:
transmitting, to a user equipment (UE), an indicator channel identifying at least a subcarrier spacing to be used in one or more subsequent control channels; and
transmitting the one or more subsequent control channels in accordance with the subcarrier spacing indicated by the indicator channel;
wherein the indicator channel further indicates a sequence of subcarrier spacing to be used in the one or more subsequent control channels, and is transmitted before a start of each symbol in the one or more control channels.

21. A method for wireless communication, comprising:
receiving, at a user equipment (UE), an indicator channel identifying at least a subcarrier spacing to be used in one or more subsequent control channels;
decoding the indicator channel;
receiving the one or more subsequent control channels; and
decoding the one or more subsequent control channels in accordance with the subcarrier spacing indicated by the indicator channel;
wherein the indicator channel is received at a boundary of a base subcarrier spacing, wherein the base subcarrier spacing is predefined and constant.

22. A method for wireless communication, comprising:
receiving, at a user equipment (UE), an indicator channel identifying at least a subcarrier spacing to be used in one or more subsequent control channels;
decoding the indicator channel;
receiving the one or more subsequent control channels; and
decoding the one or more subsequent control channels in accordance with the subcarrier spacing indicated by the indicator channel;
wherein the indicator channel is received before each switch in control channel subcarrier spacing.

23. A method for wireless communication, comprising:
receiving, at a user equipment (UE), an indicator channel identifying at least a subcarrier spacing to be used in one or more subsequent control channels;
decoding the indicator channel;
receiving the one or more subsequent control channels; and
decoding the one or more subsequent control channels in accordance with the subcarrier spacing indicated by the indicator channel;
wherein the indicator channel further indicates a sequence of subcarrier spacing to be used in the one or more subsequent control channels, and is received before a start of each symbol in the one or more control channels.

24. An apparatus for wireless communication, comprising:
a processor;
memory in electronic communication with the processor; and
the processor and memory configured to:
transmit, via a master information block (MIB) or a system information block (SIB) to a user equipment (UE), an indication of a change in a sequence of a control channel subcarrier spacing to be used by the UE; and
transmit a control message having a subcarrier spacing in accordance with the indication.

25. The apparatus of claim 24, wherein the indication is UE-specific.

26. The apparatus of claim 24, wherein transmitting the indication comprises:
transmitting the indication via radio resource control (RRC) signaling.

27. A non-transitory computer-readable medium storing code for wireless communication, the code comprising instructions executable by a processor to:
transmit, via a master information block (MIB) or a system information block (SIB) to a user equipment (UE), an indication of a change in a sequence of a control channel subcarrier spacing to be used by the UE; and
transmit a control message having a subcarrier spacing in accordance with the indication.

28. The non-transitory computer-readable medium of claim 27, wherein the indication is UE-specific.

29. The non-transitory computer-readable medium of claim 27, wherein transmitting the indication comprises:
transmitting the indication via radio resource control (RRC) signaling.

30. An apparatus for wireless communication, comprising:
means for transmitting, via a master information block (MIB) or a system information block (SIB) to a user equipment (UE), an indication of a change in a sequence of a control channel subcarrier spacing to be used by the UE; and
means for transmitting a control message having a subcarrier spacing in accordance with the indication.

31. An apparatus for wireless communication, comprising:
a processor;
memory in electronic communication with the processor; and
the processor and memory configured to:
receive, via a master information block (MIB) or a system information block (SIB) at a user equipment (UE), an indication of a change in a sequence of a control channel subcarrier spacing to be used by the UE;
configure the UE to use the control channel subcarrier spacing based on the indication;
receive a control message; and
decode at least a portion of the control message using the control channel subcarrier spacing.

32. The apparatus of claim 31, wherein the indication is UE-specific.

33. The apparatus of claim 31, wherein receiving the indication comprises:
receiving the indication via radio resource control (RRC) signaling.

34. A non-transitory computer-readable medium storing code for wireless communication, the code comprising instructions executable by a processor to:
receive, via a master information block (MIB) or a system information block (SIB) at a user equipment (UE), an indication of a change in a sequence of a control channel subcarrier spacing to be used by the UE;
configure the UE to use the control channel subcarrier spacing based on the indication;
receive a control message; and
decode at least a portion of the control message using the control channel subcarrier spacing.

35. The non-transitory computer-readable medium of claim 34, wherein the indication is UE-specific.

36. The non-transitory computer-readable medium of claim 34, wherein receiving the indication comprises:
receiving the indication via radio resource control (RRC) signaling.

37. An apparatus for wireless communication, comprising:
a processor;
memory in electronic communication with the processor; and
the processor and memory configured to:
receive, at a user equipment (UE), an indicator channel identifying at least a subcarrier spacing to be used in one or more subsequent control channels;
decode the indicator channel;
receive the one or more subsequent control channels; and
decode the one or more subsequent control channels in accordance with the subcarrier spacing indicated by the indicator channel;
wherein the indicator channel is received at a boundary of a base subcarrier spacing, wherein the base subcarrier spacing is predefined and constant.

38. An apparatus for wireless communication, comprising:
a processor;
memory in electronic communication with the processor; and
the processor and memory configured to:
receive, at a user equipment (UE), an indicator channel identifying at least a subcarrier spacing to be used in one or more subsequent control channels;
decode the indicator channel;
receive the one or more subsequent control channels; and
decode the one or more subsequent control channels in accordance with the subcarrier spacing indicated by the indicator channel;
wherein the indicator channel is received before each switch in control channel subcarrier spacing.

39. An apparatus for wireless communication, comprising:
- a processor;
- memory in electronic communication with the processor; and
- the processor and memory configured to:
  - receive, at a user equipment (UE), an indicator channel identifying at least a subcarrier spacing to be used in one or more subsequent control channels;
  - decode the indicator channel;
  - receive the one or more subsequent control channels; and
  - decode the one or more subsequent control channels in accordance with the subcarrier spacing indicated by the indicator channel;
  - wherein the indicator channel further indicates a sequence of subcarrier spacing to be used in the one or more subsequent control channels, and is received before a start of each symbol in the one or more control channels.

40. An apparatus for wireless communication, comprising:
- a processor;
- memory in electronic communication with the processor; and
- the processor and memory configured to:
  - transmit, to a user equipment (UE), an indication of a change in a sequence of control channel subcarrier spacing on a per slot basis to be used by the UE; and
  - transmit a control message having a subcarrier spacing in accordance with the indication.

41. An apparatus for wireless communication, comprising:
- a processor;
- memory in electronic communication with the processor; and
- the processor and memory configured to:
  - receive, at a user equipment (UE), an indication of a change in a sequence of control channel subcarrier spacing on a per slot basis to be used by the UE;
  - configure the UE to use the control channel subcarrier spacing based on the indication;
  - receive a control message; and
  - decode at least a portion of the control message using the control channel subcarrier spacing.

* * * * *